United States Patent
Xu et al.

(10) Patent No.: US 9,613,404 B2
(45) Date of Patent: Apr. 4, 2017

(54) IMAGE PROCESSING METHOD, IMAGE PROCESSING APPARATUS AND ELECTRONIC DEVICE

(71) Applicant: Lenovo (Beijing) Co., Ltd., Beijing (CN)

(72) Inventors: Li Xu, Beijing (CN); Zhenyu Zhu, Beijing (CN); Qiong Yan, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 143 days.

(21) Appl. No.: 14/615,010

(22) Filed: Feb. 5, 2015

(65) Prior Publication Data
US 2016/0093028 A1  Mar. 31, 2016

(30) Foreign Application Priority Data
Sep. 25, 2014 (CN) .......................... 2014 1 0497963

(51) Int. Cl.
| | |
|---|---|
| *G06T 5/00* | (2006.01) |
| *G06T 5/50* | (2006.01) |
| *G06T 7/20* | (2017.01) |
| *H04N 5/247* | (2006.01) |

(52) U.S. Cl.
CPC ............... *G06T 5/003* (2013.01); *G06T 5/50* (2013.01); *G06T 7/20* (2013.01); *H04N 5/247* (2013.01); *G06T 2207/10028* (2013.01); *G06T 2207/20201* (2013.01)

(58) Field of Classification Search
CPC .. G06T 5/003; G06T 5/50; G06T 7/20; G06T 2207/10016; G06T 2207/10028; G06T 2207/20201; H04N 5/247

USPC .......................................................... 382/255
See application file for complete search history.

(56) References Cited

U.S. PATENT DOCUMENTS

| | | | | |
|---|---|---|---|---|
| 9,076,205 | B2* | 7/2015 | Cho | ....................... G06T 5/003 |
| 2011/0164110 | A1* | 7/2011 | Fortin | ................ H04N 13/0048 348/43 |
| 2011/0199492 | A1* | 8/2011 | Kauker | ................... G06T 5/003 348/208.1 |
| 2011/0304687 | A1* | 12/2011 | Joshi | .................. H04N 5/23238 348/36 |
| 2013/0314511 | A1* | 11/2013 | Chen | .................. H04N 5/23222 348/50 |
| 2015/0254814 | A1* | 9/2015 | Ali | ........................... G06K 9/40 382/255 |

* cited by examiner

*Primary Examiner* — Yon Couso
(74) *Attorney, Agent, or Firm* — Harness, Dickey & Pierce, P.L.C.

(57) ABSTRACT

It is provided according to the present application an image processing method applied to an electronic device equipped with a binocular camera. The image processing method includes: calculating a motion direction of a first image and a motion direction of a second image, wherein the first image and second image are captured by two cameras of the binocular camera respectively; performing deblurring on the first image and the second image; and combining the images which are already deblurred to obtain a definite three-dimensional perspective image. According to the image processing method, a blurry image generated during imaging is deblurred, the blurring caused by movement or the like may be weakened, the definition of the deblurred image is better than the definition of the blurred image, thereby leading to a better imaging result.

11 Claims, 9 Drawing Sheets

IMAGE PROCESSING METHOD, IMAGE PROCESSING APPARATUS AND ELECTRONIC DEVICE

CROSS-REFERENCES TO RELATED APPLICATIONS

The present application claims priority to Chinese Patent Application No. 201410497963.7, filed with the State Intellectual Property Office of People's Republic of China on Sep. 25, 2014 entitled "IMAGE PROCESSING METHOD, IMAGE PROCESSING APPARATUS AND ELECTRONIC DEVICE", the content of which is incorporated herein by reference in its entirety.

FIELD

The disclosure generally relates to the field of an electronic device, and in particular to an image processing method, an image processing apparatus and an electronic device.

BACKGROUND

With the development of imaging technology, more and more electronic devices are provided with an imaging function. Some electronic devices are equipped with binocular cameras to ensure a real imaging result. The binocular camera is a camera group consisting of two cameras simulating human eye imaging, and can combine the images captured respectively by the two cameras to obtain a three-dimensional perspective image.

However, the captured image may be blurry due to that a hand of a user trembles or various external movements occur for example a capture object moves when the user captures the image, thereby leading to a bad imaging result.

SUMMARY

In view of this, it is provided an image processing method according to the disclosure, for solving the problem that the captured image may be blurry due to that a movement occurs when capturing the image.

To achieve the above object, there are provided following technical solutions according to the disclosure.

According to an aspect of the present disclosure, an image processing method is provided, the method includes:
  capturing a first image and a second image using an imaging device;
  calculating a motion direction of the first image and a motion direction of the second image;
  performing deblurring on the first image based on the motion direction of the first image to obtain a third image, and performing deblurring on the second image based on the motion direction of the second image to obtain a fourth image; and
  combining the third image with the fourth image to obtain a fifth image.

Optionally, in the above image processing method, the calculating the motion direction of the first image and the motion direction of the second image is based on a preset motion algorithm includes:
  analyzing the first image based on a preset depth analyzing rule to obtain a first depth image, and analyzing the second image based on the preset depth analyzing rule to obtain a second depth image; and
  estimating the first depth image based on a preset estimating algorithm to obtain a first motion direction of a pixel in the first image, and estimating the second depth image based on the preset estimating algorithm to obtain a second motion direction of a pixel in the second image.

Optionally, in the above image processing method, the analyzing the first image based on the preset depth analyzing rule to obtain the first depth image and analyzing the second image based on the preset depth analyzing rule to obtain the second depth image includes:
  selecting one of the first image and the second image as a first base image with the other one as a first reference image;
  selecting a pixel in the first base image;
  searching for a corresponding pixel in the first reference image that matches with the selected pixel in the first base image;
  determining a depth value of the selected pixel by using a preset depth algorithm based on a position of the selected pixel in the first base image, a position of the corresponding pixel in the first reference image and a spatial parameter of the imaging device;
  calculating the depth value of each of the pixels in the first base image other than the selected pixels; and
  deriving a depth image of the first base image based on the depth value of each of the pixels in the first base image.

Optionally, in the above image processing method, the estimating the first depth image based on the preset estimating algorithm to obtain the first motion direction of a pixel in the first image and estimating the second depth image based on the preset estimating algorithm to obtain the second motion direction of a pixel in the second image includes:
  selecting one of the first image and the second image as a second base image and setting the depth image of the second base image as a base depth image;
  determining pixels with the same depth value in the second base image and positions of the pixels with the same depth value in the second base image based on the base depth image;
  calculating the motion direction of the pixels with the same depth value in the second base image based on a preset motion direction estimating algorithm in conjunction with information about the positions of the pixels with the same depth value in the second base image; and
  calculating the motion direction of each of the pixels in the second base image other than the pixels with the same depth value.

Optionally, in the above image processing method, the performing deblurring on the first image based on the preset deblurring rule in conjunction with the first motion direction to obtain the third image and performing deblurring on the second image based on the preset deblurring rule in conjunction with the second motion direction to obtain the fourth image includes:
  performing deconvolution calculation on the pixel in the first image to obtain the third image based on a preset blurring kernel model in conjunction with the first motion direction; and
  performing the deconvolution calculation on the pixel in the second image to obtain the fourth image based on the preset blurring kernel model in conjunction with the second motion direction.

According to an aspect of the present disclosure, an image processing apparatus is provided, which includes:
  an imaging device for capturing a first image and a second image;
  a calculating module configured to calculate a motion direction of the first image and a motion direction of the second image;
  a deblurring module configured to perform deblurring on the first image based on the motion direction of the first image to obtain a third image, and perform deblurring on the second image based on the motion direction of the second image to obtain a fourth image; and
  a combining module configured to combine the third image with the fourth image to obtain a fifth image.

Optionally, in the above image processing apparatus, the calculating module includes:
  a first analyzing unit, configured to analyze the first image based on a preset depth analyzing rule to obtain a first depth image, and to analyze the second image based on the preset depth analyzing rule to obtain a second depth image; and
  a first calculating unit, configured to estimate the first depth image based on a preset estimating algorithm to obtain a first motion direction of a pixel in the first image, and to estimate the second depth image based on the preset estimating algorithm to obtain a second motion direction of a pixel in the second image.

Optionally, in the above image processing apparatus, the first analyzing unit includes:
  a first selecting subunit, configured to select one of the first image and the second image as a first base image with the other one as a first reference image, and to select a pixel from the pixels in the first base image;
  a searching subunit, configured to search for a corresponding pixel in the first reference image matching with the selected pixel;
  a first calculating subunit, configured to determine a depth value of the selected pixel by using a preset depth algorithm based on a position of the selected pixel in the first base image, a position of the corresponding pixel in the first reference image and a spatial parameter of the binocular camera, and to calculate the depth value of each of the pixels in the first base image other than the selected pixel; and
  a drawing subunit, configured to draw the depth image of the first base image based on the depth value of each of the pixels in the first base image.

Optionally, in the above image processing apparatus, the first calculating unit includes:
  a second selecting subunit, configured to select one of the first image and the second image as a second base image, and to set the depth image of the second base image as a base depth image;
  a determining subunit, configured to determine pixels with the same depth value in the second base image and positions of the pixels with the same depth value in the second base image based on the base depth image; and
  a second calculating subunit, configured to calculate the motion direction of the pixels with the same depth value in the second base image based on a preset motion direction estimating algorithm in conjunction with information about the positions of the pixels with the same depth value in the second base image, and to calculate the motion direction of each of the pixels in the second base image other than the pixels with the same depth value.

Optionally, in the above image processing apparatus, the deblurring module is further configured to:
  perform deconvolution calculation on the pixel in the first image to obtain the third image based on a preset blurring kernel model in conjunction with the first motion direction; and
  perform the deconvolution calculation on the pixel in the second image to obtain the fourth image based on the preset blurring kernel model in conjunction with the second motion direction.

According to an aspect of the present disclosure, an electronic device is provided, which includes a binocular camera and any one of the above image processing apparatuses.

BRIEF DESCRIPTION OF THE DRAWINGS

The accompanying drawings to be used in the description of the embodiments or the prior art are described briefly as follows, so that the technical solutions according to the embodiments of the present disclosure or according to the prior art become clearer. It is apparent that the accompanying drawings in the following description are a few of embodiments of the present disclosure. For those skilled in the art, other accompanying drawings may be obtained according to these accompanying drawings without any creative work.

DETAILED DESCRIPTION

The technical solution according to the embodiments of the present disclosure are described clearly and completely as follows in conjunction with the accompany drawings in the embodiments of the present disclosure. It is obvious that the described embodiments are only a few of the embodiments according to the present disclosure. All the other embodiments obtained by those skilled in the art based on the embodiments in the present disclosure without any creative work belong to the scope of protection of the present disclosure.

Figure 1:
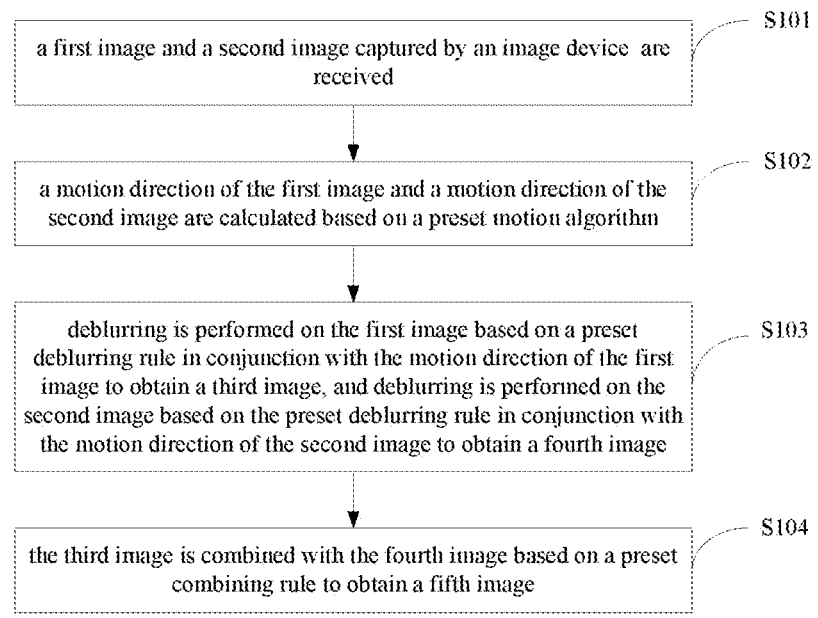
FIG. 1 is a flow chart of a first embodiment of an image processing method according to the application.

As is shown in FIG. 1, which is a flow chart of a first embodiment of an image processing method according to the application. The image processing method is applied to an electronic device equipped with a binocular camera. The electronic device may be a desktop, a laptop, a tablet computer, a mobile phone, a smart TV, a smart watch, a wearable device or the like.

The image processing method may include step S101 to step S104.

In step S101, a first image and a second image captured by an imaging device (e.g. the binocular camera) are received.

One of two cameras of the binocular camera equipped in the electronic device captures a capture object for one frame as the first image, and the other one of the two cameras of the binocular camera captures simultaneously the same capture object for one frame as the second image.

The first image is corresponding to a position of the one of the two cameras of the binocular camera, and the second image is corresponding to a position of the other one of the two cameras of the binocular camera. The first image and the second image are similar but different.

In practice, the images captured may be blurry due to that the electronic device trembles or the capture object moves when capturing the images.

As is shown in FIG. 2, which shows the first image and the second image in the first embodiment of the image processing method. Figure (a) is the first image captured by the one of the two cameras of the binocular camera, and Figure (b) is the second image captured by the other one of the two cameras of the binocular camera. The first image and the second image are blurry, content of the two images are similar but different.

In step S102, a motion direction of the first image and a motion direction of the second image are calculated based on a preset motion algorithm.

First to be noted that an actual image blurring principle is that different depth values of the pixels correspond to different motion directions of the pixels which cause the blurring. Therefore, the motion direction of the blurry image is calculated, and deblurring is performed on the blurry image based on the motion direction.

The motion algorithm is preset, and the motion direction of the image may be calculated based on the preset motion algorithm.

Specifically, the motion direction of the first image is calculated based on information of the first image, and the motion direction of the second image is calculated based on information of the second image.

The process of calculating the motion direction is described in detail in later embodiments, which is not described herein.

In step S103, deblurring is performed on the first image based on a preset deblurring rule in conjunction with the motion direction of the first image to obtain a third image, and deblurring is performed on the second image based on the preset deblurring rule in conjunction with the motion direction of the second image to obtain a fourth image.

The deblurring rule is preset, and the preset deblurring rule matches with the motion direction. The image the motion direction of which is already determined may be deblurred based on the preset deblurring rule to obtain a clearer image.

Specifically, deblurring is performed on the first image based on the preset deblurring rule in conjunction with the motion direction of the first image to obtain the third image, and deblurring is performed on the second image based on the preset deblurring rule in conjunction with the motion direction of the second image to obtain the fourth image.

The process of performing deblurring on the image is described in detail in later embodiments, which is not described herein.

In step S104, the third image is combined with the fourth image based on a preset combining rule to obtain a fifth image.

The definition of the third image is better than the definition of the first image, and the definition of the fourth image is better than the definition of the second image.

Combining the third image and the fourth image to obtain the fifth image includes: acquiring a first pixel in the third image and information about a position of the first pixel, and determining the capture object corresponding to the first pixel; searching for a second pixel in the fourth image matching with the capture object corresponding to the first pixel based on the capture object corresponding to the first pixel, and determining information about a position of the second pixel, where the first pixel and the second pixel constitute a corresponding pixel group; calculating a position deviation of corresponding pixel group constituted of the first pixel and the second pixel based on a preset algorithm in conjunction with the information about the position of the first pixel and the information about the position of the second pixel; calculating the position deviation of each corresponding pixel group between the third image and the fourth image; restoring depth information in a three-dimensional coordinate based on the position deviation of each corresponding pixel group; and combining the corresponding pixels in the third image and the fourth image based on the depth information of each corresponding pixel group to obtain the fifth image.

Figure 2A:
FIGS. 2A and 2B show a first image and a second image in the first embodiment of the image processing method according to the application.
Figure 2B:
Figure 3:
FIG. 3 shows a fifth image in the first embodiment of the image processing method according to the application.

As is shown in FIG. 3, which shows the fifth image obtained by combining the first image and the second image in FIGS. 2A and 2B. The fifth image is more definite than the first image and the second image, and may lead to a strong three-dimensional feeling.

In summary, it is provided an image processing method according to the embodiment. According to the image processing method, a motion direction of a first image and a motion direction of a second image are calculated based on a preset motion algorithm, where the first image is captured by one of two cameras of the binocular camera and the second image is captured by the other one of the two cameras of the binocular camera; deblurring is performed on the first image and the second image based on a preset deblurring rule; and the images which are already deblurred are combined to obtain a clear three-dimensional perspective image. According to the image processing method, a blurry image generated during imaging is deblurred, the blurring caused by movement or the like may be weakened, the sharpness of the deblurred image is better than the sharpness of the blurred image, thereby leading to a better imaging result.

Figure 4:
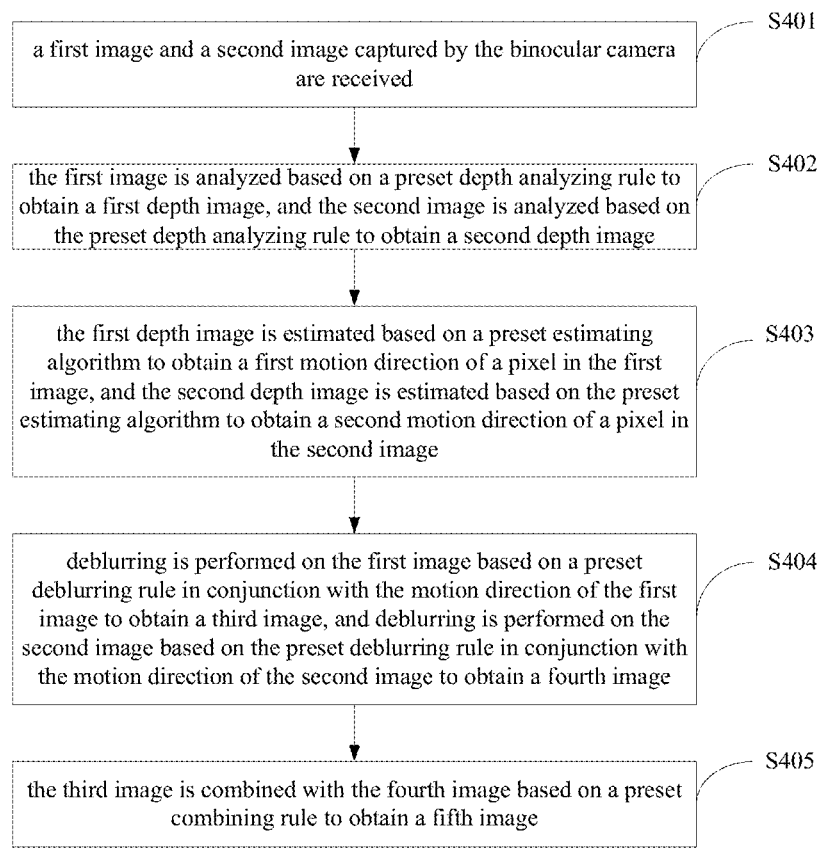
FIG. 4 is a flow chart of a second embodiment of the image processing method according to the application.

As is shown in FIG. 4, which is a flow chart of a second embodiment of the image processing method according to the application. The image processing method may include step S401 to step S405.

In step S401, a first image and a second image captured by the binocular camera are received.

Step S401 is the same as step S101 in the first embodiment of the image processing method, which is not described herein.

In step S402, the first image is analyzed based on a preset depth analyzing rule to obtain a first depth image, and the second image is analyzed based on the preset depth analyzing rule to obtain a second depth image.

The depth refers to a spatial distance between the capture object in the image and the camera by which the image is captured.

The depth analyzing rule is preset in the electronic device, the first image is analyzed based on the preset depth analyzing rule to obtain the first depth image of the first image, and the second image is analyzed based on the preset depth analyzing rule to obtain the second depth image of the second image.

Specifically, analyzing the first image based on the preset depth analyzing rule to obtain the first depth image includes: selecting a pixel A from the pixels in the first image; searching for a pixel A' in the second image matching with the pixel A; determining an actual physical position corresponding to the pixel A by using the triangulation algorithm based on a position of the pixel A in the first image, a position of the pixel A' in the second image and a spatial parameter of the binocular camera; calculating a depth value of the pixel A in the first image based on the distance between the actual physical position corresponding to the pixel A and the position of the pixel A in the first image; calculating the depth value of each of the pixels in the first image other than the pixel A; and drawing the first depth image based on the depth value of each of the pixels in the first image.

Specifically, analyzing the second image based on the preset depth analyzing rule to obtain the second depth image includes: selecting a pixel B from the pixels in the second image; searching for a pixel B' in the first image matching with the pixel B; determining an actual physical position corresponding to the pixel B by using the triangulation algorithm based on a position of the pixel B' in the first image, a position of the pixel B in the second image and the spatial parameter of the binocular camera; calculating a depth value of the pixel B in the second image based on the distance between the actual physical position corresponding to the pixel B and the position of the pixel B in the second image; calculating the depth value of each of the pixels in the second image other than the pixel B; and drawing the second depth image based on the depth value of each of the pixels in the second image.

The spatial parameters of the binocular camera include the distance between the centers of two cameras or the like.

It should be noted that the method for calculating the depth image of each image in the embodiment is not limited to the described method. In practice, the method for calculating the depth image may be other methods capable of obtaining the depth image of the image, which is not limited herein.

In step S403, the first depth image is estimated based on a preset estimating algorithm to obtain a first motion direction of a pixel in the first image, and the second depth image is estimated based on the preset estimating algorithm to obtain a second motion direction of a pixel in the second image.

Each pixel in the image corresponds to a depth value, the depth value is a comparable value, and the depth values of the pixels are compared to determine whether the pixels are the same pixel.

The estimating algorithm is preset, and generally the preset estimating algorithm is the blind deconvolution algorithm.

Specifically, the motion direction may be calculated based on the pixels with the same depth value, the process of calculating the motion direction is described in detail in later embodiments, which is not described herein.

In step S404, deblurring is performed on the first image based on a preset deblurring rule in conjunction with the motion direction of the first image to obtain a third image, and deblurring is performed on the second image based on the preset deblurring rule in conjunction with the motion direction of the second image to obtain a fourth image.

In step S405, the third image is combined with the fourth image based on a preset combining rule to obtain a fifth image.

Step S404 and step S405 are respectively the same as step S103 and step S104 in the first embodiment of the image processing method, which are not described herein.

In summary, according to the image processing method provided in the embodiment, the depth image of the first image and the depth image of the second image are determined based on the preset depth analyzing rule, the first motion direction of the pixel in the first image and the second motion direction of the pixel in the second image are obtained based on the preset estimating algorithm in conjunction with the depth images, and deblurring is performed on the blurry image based on the motion direction of blurry image. According to the image processing method, the motion direction of the pixels in the image is calculated based on the depth image of the image, deblurring is performed on a blurry image generated during imaging, the blurring caused by movement or the like may be weakened, the definition of the obtained image is better than the definition of the blurry image, thereby leading to a better imaging result.

Figure 5:
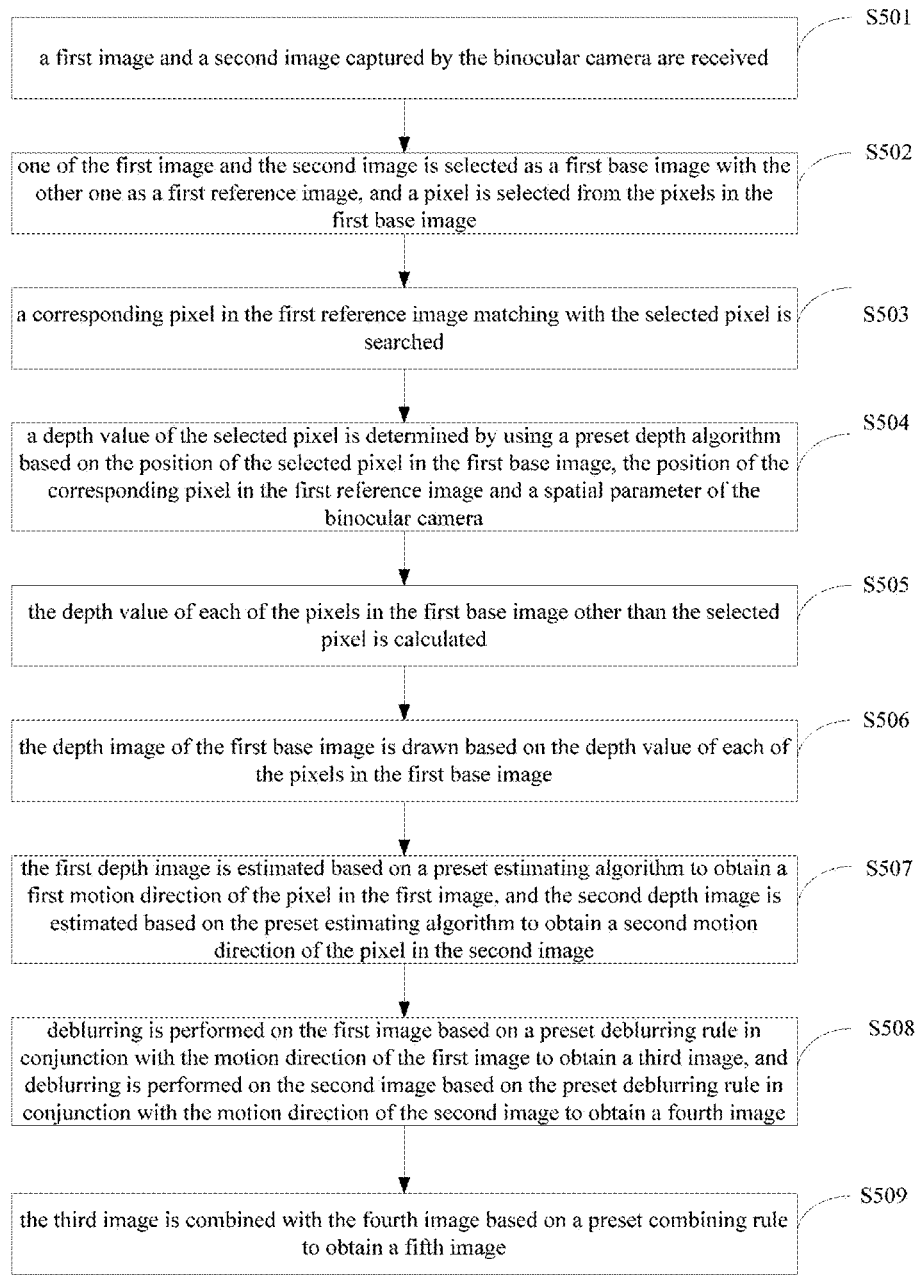
FIG. 5 is a flow chart of a third embodiment of the image processing method according to the application.

As is shown in FIG. 5, which is a flow chart of a third embodiment of the image processing method according to the application. The image processing method may include step S501 to step S509.

In step S501, a first image and a second image captured by the binocular camera are received.

Step S501 is the same as step S401 in the second embodiment of the image processing method, which is not described herein.

In step S502, one of the first image and the second image is selected as a first base image with the other one as a first reference image, and a pixel is selected from the pixels in the first base image.

Any one of the first image and the second image is selected as the first base image, and the other one is as the first reference image. A motion direction of the pixel in the first base image is calculated based on the first base image and the first reference image.

It should be noted that a process from step S502 to step S505 is the process of calculating the motion direction of any one of the pixels in the first base image.

Each image includes a plurality of pixels, and any one of the pixels in the first base image is selected as a base pixel for determining the motion direction.

In step S503, a corresponding pixel in the first reference image matching with the selected pixel is searched.

The first base image and the first reference image are captured by two cameras of the binocular camera, the two images are similar but there is a little angle difference between the two images. In each of the two images, there is image content corresponding to the same capture object.

Therefore, a pixel in the first reference image corresponding to the selected pixel may be found, a position of the corresponding pixel in the first reference image is different from a position of the selected pixel in the first base image.

Step S503 includes: determining a capture object corresponding to the selected pixel in the first base image; the corresponding pixel in the first reference image matching with the selected pixel is searched based on the capture object, and the matching pixel is set as the corresponding pixel matching with the selected pixel.

Specifically, in the case that the selected pixel and the corresponding pixel matching with the selected pixel are for the same capture object (or capture content), a matching degree between the selected pixel and the corresponding pixel is high.

In practice, the process of determining the matching degree between the selected pixel and the corresponding pixel may include: firstly determining the position of the selected pixel in the first base image, and searching for a region in the first reference image close to the position of the selected pixel in the first base image based on the position of the selected pixel in the first base image; and then comparing each of the pixels in the region with the selected pixel in the first base image based on various information about the capture content such as color of the pixel or the like, to obtain the matching degree, the pixel with the highest matching degree is the corresponding pixel matching with the selected pixel.

In step S504, a depth value of the selected pixel is determined by using a preset depth algorithm based on the position of the selected pixel in the first base image, the position of the corresponding pixel in the first reference image and a spatial parameter of the binocular camera.

The position of the selected pixel in the first base image such as a coordinate position of the selected pixel in the first base image is recorded when the selected pixel is selected.

The position, such as a coordinate position, of the corresponding pixel in the first reference image determined in step S503 is determined.

The depth algorithm is preset, and an actual physical position corresponding to the selected pixel is calculated by using the preset depth algorithm based on the position of the selected pixel in the first base image, the position of the corresponding pixel in the first reference image and the spatial parameter of the binocular camera. The actual physical position corresponding to the selected pixel refers to the position of the capture object corresponding to the selected pixel in three-dimensional space.

Figure 6:
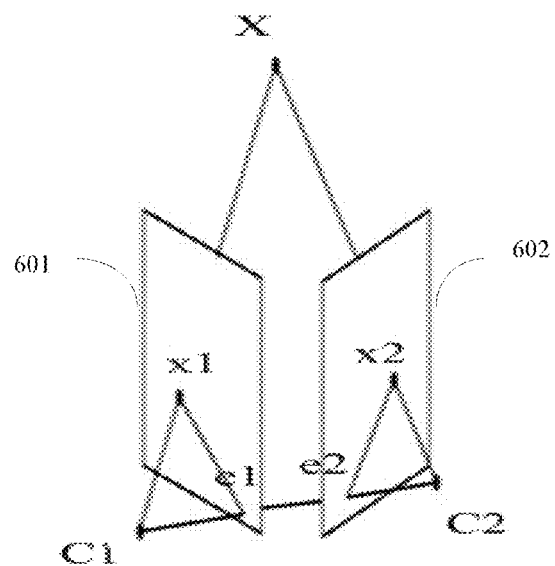
FIG. 6 is a schematic diagram of calculating an actual physical position corresponding to a pixel in the third embodiment of the image processing method according to the application.

As is shown in FIG. 6, which is a schematic diagram of calculating the actual physical position corresponding to the pixel. C1 and C2 are positions of two cameras of the binocular camera, in an image 601, a pixel x1 is a certain pixel in the image captured by the camera at C1, and in an image 602, a pixel x2 is a certain pixel in the image captured by the camera at C2, the pixel x1 and the pixel x2 are pixels for a capture object X, the capture object X locates at an intersection point between a straight line defined by C1 and the pixel x1 and a straight line defined by C2 and the pixel x2, the distance between C1 and C2 is known, the distance between C1 and the pixel x1 is determined when the pixel x1 is selected, and the distance between C2 and the pixel x2 is determined when the pixel x2 is selected. The distance between the capture object X and the pixel x1 and the distance between the capture object X and the pixel x2 may be calculated according to the trigonometric function. The actual physical position corresponding to the pixel x1 is calculated based on the coordinates of C1, C2, the pixel x1 and the pixel x2.

Specifically, the actual physical position refers to the distance between the capture object X and the electronic device, such as the distance between the capture object X and the midpoint of C1 and C2.

It should be noted that in the case that an xy coordinate system is defined with the straight line defined by C1 and C2 being an x-axis and the direction from C1 to C2 being a positive direction of the x-axis and the direction from a point in the straight line defined by C1 and C2 to the capture object X being a positive direction of a y-axis, the coordinate of the capture object X may be determined as the actual physical position corresponding to the pixel x1.

It should be noted that the actual physical position corresponding to the pixel x1 is the same as the actual physical position corresponding to the pixel x2 in the image 602. In the case that the image 602 is set as the first base image, the actual physical position corresponding to the pixel x2 is not required to be calculated, because the actual physical position corresponding to the pixel x2 is the same as the actual physical position corresponding to the pixel x1 calculated based on the image 601.

The depth value of the pixel x1 refers to the distance between the capture object X corresponding to the pixel x1 and the camera for capturing the image to which the pixel x1 belongs.

The actual physical position corresponding to the pixel x1 is determined, the distance between the actual physical position corresponding to the pixel x1 and the camera for capturing the image to which the pixel x1 belongs is calculated based on the actual physical position corresponding to the pixel x1 and the position of the camera for capturing the image to which the pixel x1 belongs, thereby the depth value of the pixel x1 is calculated.

As is shown in FIG. 6, in the case that the distance between the capture object X to the straight line defined by C1 and C2 is known, the distance between the capture object X to C1 may be calculated according to the triangulation algorithm, thereby the depth value of the pixel x1 in the first base image is calculated.

In step S505, the depth value of each of the pixels in the first base image other than the selected pixel is calculated.

The above process from step S502 to step S505 is the process of calculating the depth value of any one of the pixels in the first base image. The depth value of each of the pixels in the first base image other than the selected pixel is calculated based on the process from step S502 to step S505.

It should be noted that, the first image is selected as the first base image and the depth value of each of the pixels in the first base image is calculated. In the case that the second image is selected as the first base image, if there is a pixel in the second image matching with a pixel in the first image, the actual physical position corresponding to the pixel in the second image is not required to be calculated, because the actual physical position corresponding to the pixel in the second image is the same as the actual physical position corresponding to the matching pixel in the first image.

In step S506, the depth image of the first base image is drawn based on the depth value of each of the pixels in the first base image.

The depth value of each of the pixels in the first base image is determined in above steps. The depth image of the first base image is drawn based on the depth value of each of the pixels in the first base image.

Specifically, a gray value of the pixel is used to indicate the depth value of the pixel, the greater the depth value of the pixel is, the greater the gray value of the pixel is.

Figure 7:
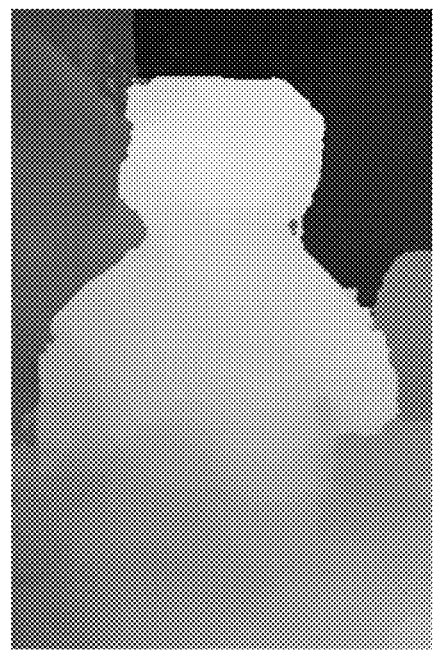
FIG. 7 shows a first depth image in the third embodiment of the image processing method according to the application.

FIG. 7 shows a first depth image of the first image in FIG. 2A.

The first image is taken as an example, the process from step S502 to step S506 includes: selecting a pixel A from the pixels in the first image; searching for a pixel A' in the second image matching with the pixel A; determining an actual physical position corresponding to the pixel A by using the triangulation algorithm based on a position of the pixel A in the first image, a position of the pixel A' in the second image and a spatial parameter of the binocular camera; calculating a depth value of the pixel A in the first image based on the distance between the actual physical position corresponding to the pixel A and the position of the pixel A in the first image; calculating the depth value of each of the pixels in the first image other than the pixel A; and drawing the first depth image based on the depth value of each of the pixels in the first image.

The second image is taken as an example, the process from step S502 to step S507 includes: selecting a pixel B from the pixels in the second image; searching for a pixel B' in the first image matching with the pixel B; determining an actual physical position corresponding to the pixel B by using the triangulation algorithm based on a position of the pixel B' in the first image, a position of the pixel B in the second image and the spatial parameter of the binocular camera; calculating a depth value of the pixel B in the second image based on the distance between the actual physical position corresponding to the pixel B and the position of the pixel B in the second image; calculating the depth value of each of the pixels in the second image other than the pixel B; and drawing the second depth image based on the depth value of each of the pixels in the second image.

In step S507, the first depth image is estimated based on a preset estimating algorithm to obtain a first motion direction of the pixel in the first image, and the second depth image is estimated based on the preset estimating algorithm to obtain a second motion direction of the pixel in the second image.

In step S508, deblurring is performed on the first image based on a preset deblurring rule in conjunction with the motion direction of the first image to obtain a third image, and deblurring is performed on the second image based on the preset deblurring rule in conjunction with the motion direction of the second image to obtain a fourth image.

In step S509, the third image is combined with the fourth image based on a preset combining rule to obtain a fifth image.

Step S507 to step S509 are respectively the same as step S403 to step S405 in the second embodiment of the image processing method, which are not described herein.

In summary, according to the image processing method provided in the embodiment, the depth value of each of the pixels in the image is calculated, the depth image of the image is drawn, the motion direction of the pixel in the image is determined based on the depth image, deblurring is performed on the image, the images which are already deblurred are combined to obtain a clear three-dimensional perspective image. According to the image processing method, deblurring is performed on a blurry image generated during imaging, the blurring caused by movement or the like may be weakened, the definition of the deblurred image is better than the definition of the blurry image, thereby leading to a better imaging result.

Figure 8:
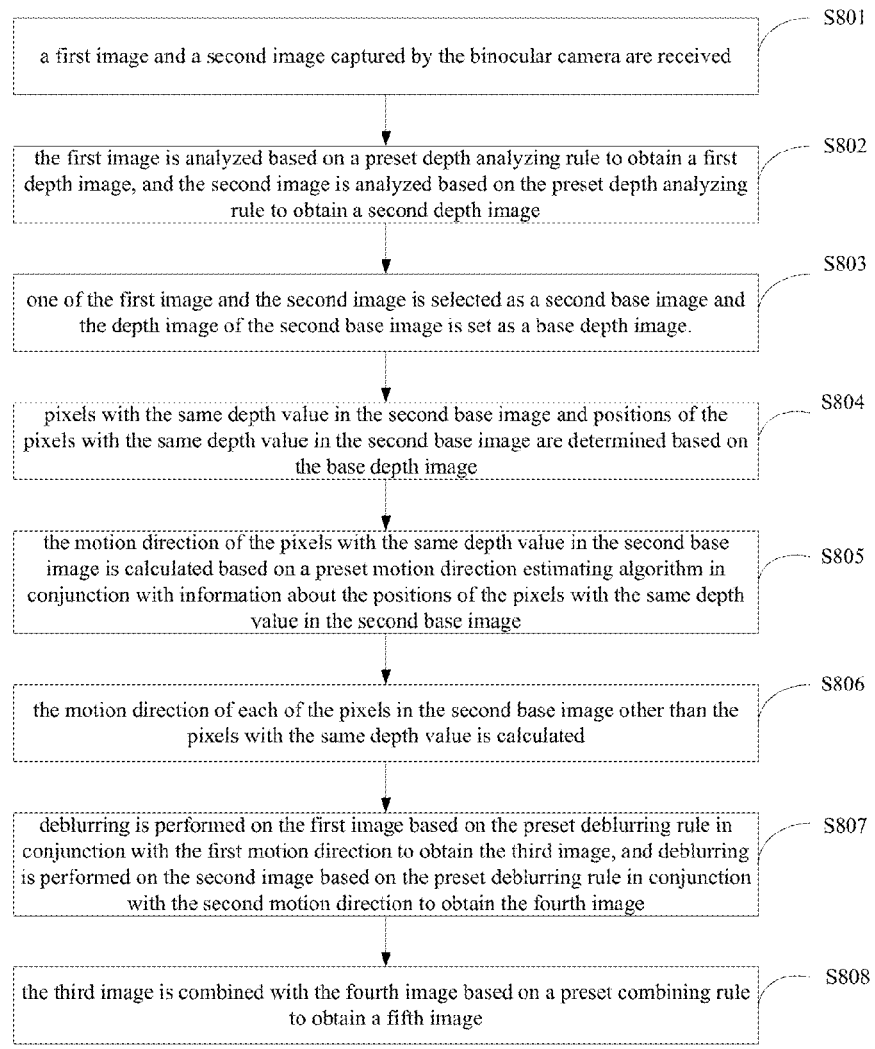
FIG. 8 is a flow chart of a fourth embodiment of the image processing method according to the application.

As is shown in FIG. 8, which is a flow chart of a fourth embodiment of the image processing method according to the application. The image processing method may include step S801 to step S808.

In step S801, a first image and a second image captured by the binocular camera are received.

In step S802, the first image is analyzed based on a preset depth analyzing rule to obtain a first depth image, and the second image is analyzed based on the preset depth analyzing rule to obtain a second depth image.

Step S801 and step S802 are respectively the same as step S401 and step S402 in the second embodiment of the image processing method, which are not described herein.

In step S803, one of the first image and the second image is selected as a second base image and the depth image of the second base image is set as a base depth image.

Any one of the first image and the second image is selected as the second base image and the depth image of the second base image is set as the base depth image. The motion direction of the pixel in the second base image is calculated based on the second base image and the base depth image of the second base image.

It should be noted that a process from step S804 to step S805 is the process of calculating the motion direction of any one of the pixels in the second base image.

In step S804, pixels with the same depth value in the second base image and positions of the pixels with the same depth value in the second base image are determined based on the base depth image.

An actual image blurring principle is that different depth values of the pixels correspond to different motion directions of the pixels which cause the blurring. In the present embodiment, the motion direction of the pixel is calculated based on the depth value of the pixel, and specifically, the motion direction of the pixel is calculated based on the pixels with the same depth value.

Specifically, the pixels with the same depth value in the second base image and positions of the pixels with the same depth value in the second base image are determined based on the base depth image. The pixels with the same depth value in the second base image constitute a pixel group with the same depth value, and the pixel group includes a plurality of pixels.

In step S805, the motion direction of the pixels with the same depth value in the second base image is calculated based on a preset motion direction estimating algorithm in conjunction with information about the positions of the pixels with the same depth value in the second base image.

The preset motion direction estimating algorithm is the blind deconvolution algorithm.

Specifically, a deblurring rule based on a gradient distribution model is determined based on a statistical properties analysis of an image model and the gradient distribution of a blurry image and a definite image. The definite image meets a specific heavy-tailed distribution rule, and the blurry image does not meet the heavy-tailed distribution rule. A combined posterior probability of an original image and a blurring kernel is created during observing the original image. The blurring kernel is obtained by maximizing the combined posterior probability, which indicates the motion direction of the pixel in the original image.

In step S806, the motion direction of each of the pixels in the second base image other than the pixels with the same depth value is calculated.

The motion direction of each of the pixels in the second base image other than the pixels with the same depth value is calculated through the process similar to step S805.

Figure 9:
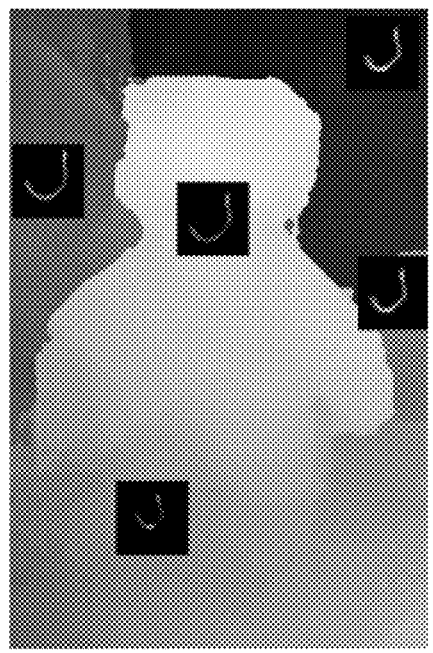
FIG. 9 is a schematic diagram of a motion direction of the depth image in the fourth embodiment of the image processing method according to the application.

As is shown in FIG. 9, which is a schematic diagram of the motion direction of the depth image shown in FIG. 7. The curve shown in the black box indicates the motion direction of the depth image.

In step S807, deblurring is performed on the first image based on the preset deblurring rule in conjunction with the first motion direction to obtain the third image, and deblurring is performed on the second image based on the preset deblurring rule in conjunction with the second motion direction to obtain the fourth image.

Step S807 includes: performing deconvolution calculation on the pixel in the first image to deblur the first image to obtain the third image which is already deblurred based on a preset blurring kernel model in conjunction with the first motion direction; and performing the deconvolution calculation on the pixel in the second image to deblur the second image to obtain the fourth image which is already deblurred based on the preset blurring kernel model in conjunction with the second motion direction.

The deconvolution calculation is performed on each of the pixels in the first image to deblur the first image to obtain the definite third image based on the preset deblurring rule in conjunction with the blurring kernel calculated in step S805 and the first motion direction. And the deconvolution calculation is performed on each of the pixels in the second image to deblur the second image to obtain the definite fourth image based on the preset deblurring rule in conjunction with the blurring kernel calculated in step S805 and the second motion direction.

For example, there is a known blurry image $P(x, y)$, the definite image calculated based on the blurry image $P(x, y)$ is represented as an image $I(x, y)$. The relationship between the two images is $P(x, y)=I(x, y)*K$.

In the above equation, * represents a convolution operation, K is the blurring kernel.

The equation is transformed as:

$$I(x, y)=\mathrm{argmin}\|P(x, y)-I(x, y)*K\|^2+\|I(x, y)\|^2.$$

The above equation is solved by using the ROF (Rudin-Osher-Fatemi), blurring is performed on the blurry image to obtain the clear image.

The ROF (Rudin-Osher-Fatemi) is a known algorithm in the conventional art, which is not described herein.

In step S808, the third image is combined with the fourth image based on a preset combining rule to obtain a fifth image.

Step S808 is the same as step S405 in the second embodiment of the image processing method, which is not described herein.

In summary, according to the image processing method provided in the embodiment, the motion direction of the image is determined based on the preset motion direction estimating algorithm in conjunction with the depth image of the image, deblurring is performed on the image based on the motion direction of the image, the images which are already deblurred are combined to obtain a definite three-dimensional perspective image. According to the image processing method, deblurring is performed on an image generated, the blurring caused by movement or the like may be weakened, the definition of the deblurred image is better than the definition of the blurry image, thereby leading to a better imaging result.

The image processing method is described in detail in the above embodiments of the disclosure, and the image processing method according to the disclosure may be implemented in various forms. It is also provided an image processing apparatus according to the disclosure. The embodiments of the image processing apparatus are described in detail below.

Figure 10:
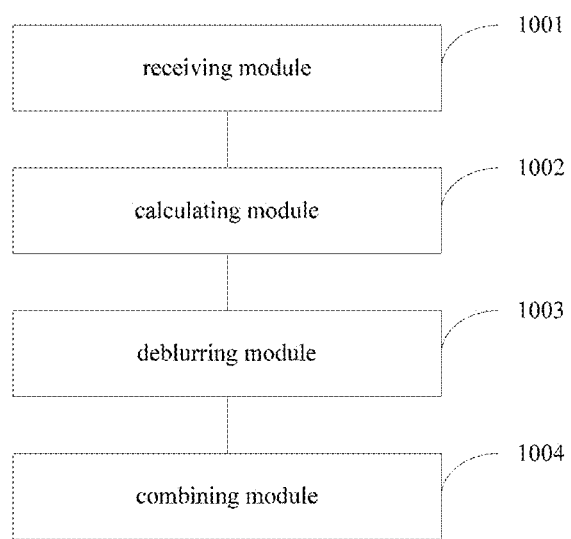
FIG. 10 is a schematic structural diagram of a first embodiment of an image processing apparatus according to the application.

As is shown in FIG. 10, which is a schematic structural diagram of a first embodiment of an image processing apparatus according to the application. The image processing apparatus is applied to an electronic device equipped with a binocular camera. The electronic device may be a desktop, a laptop, a tablet computer, a mobile phone, a smart TV, a smart watch, a wearable device or the like.

The image processing apparatus includes a receiving module 1001, a calculating module 1002, a deblurring module 1003 and a combining module 1004.

The receiving module 1001 is configured to receive a first image and a second image captured by the binocular camera.

One of two cameras of the binocular camera equipped in the electronic device captures a capture object for one frame, and the other one of the two cameras of the binocular camera captures simultaneously the same capture object for one frame. The receiving module 1001 receives the two frames of images and sets respectively the two frames of images as the first image and the second image.

The first image is corresponding to a position of the one of the two cameras of the binocular camera, and the second image is corresponding to a position of the other one of the two cameras of the binocular camera. The first image and the second image are similar but different.

In practice, the images captured may be blurry due to that the electronic device trembles or the capture object moves when capturing the images.

FIG. 2A is the first image captured by the one of the two cameras of the binocular camera, and FIG. 2B is the second image captured by the other one of the two cameras of the binocular camera. The first image and the second image are blurry, content of the two images are similar but different.

The calculating module 1002 is configured to calculate a motion direction of the first image and a motion direction of the second image based on a preset motion algorithm.

First to be noted that an actual image blurring principle is that different depth values of the pixels correspond to different motion directions of the pixels which cause the blurring. Therefore, the motion direction of the blurry image is calculated, and deblurring is performed on the blurry image based on the motion direction.

The motion algorithm is preset, and the motion direction of the image may be calculated based on the preset motion algorithm.

Specifically, the calculating module 1002 calculates the motion direction of the first image based on information of the first image and the calculating module 1002 calculates the motion direction of the second image based on information of the second image.

The process of calculating the motion direction is described in detail in later embodiments, which is not described herein.

The deblurring module 1003 is configured to perform deblurring on the first image based on a preset deblurring rule in conjunction with the motion direction of the first image to obtain a third image, and perform deblurring on the second image based on the preset deblurring rule in conjunction with the motion direction of the second image to obtain a fourth image.

The deblurring rule is preset, and the preset deblurring rule matches with the motion direction. The deblurring module 1003 may perform deblurring on the image the motion direction of which is already determined based on the preset deblurring rule to obtain a more definite image.

Specifically, blurring is performed on the first image based on the preset deblurring rule in conjunction with the motion direction of the first image to obtain the third image, and blurring is performed on the second image based on the preset deblurring rule in conjunction with the motion direction of the second image to obtain the fourth image.

The process of performing deblurring on the image is described in detail in later embodiments, which is not described herein.

The combining module 1004 is configured to combine the third image with the fourth image based on a preset combining rule to obtain a fifth image.

The definition of the third image is better than the definition of the first image, and the definition of the fourth image is better than the definition of the second image.

The combining module 1004 is configured to: acquire a first pixel in the third image and information about a position of the first pixel, and determine the capture object corresponding to the first pixel; search for a second pixel in the fourth image matching with the capture object corresponding to the first pixel based on the capture object corresponding to the first pixel, and determine information about a position of the second pixel, where the first pixel and the second pixel constitute a corresponding pixel group; calculate a position deviation of corresponding pixel group constituted of the first pixel and the second pixel based on a preset algorithm in conjunction with the information about the position of the first pixel and the information about the position of the second pixel; calculate the position deviation of each corresponding pixel group between the third image and the fourth image; restore depth information in a three-dimensional coordinate based on the position deviation of each corresponding pixel group; and combine the corresponding pixels in the third image and the fourth image based on the depth information of each corresponding pixel group to obtain the fifth image.

As is shown in FIG. 3, which shows the fifth image obtained by combining the first image and the second image in FIGS. 2A and 2B. The fifth image is more definite than the first image and the second image, and may lead to a strong three-dimensional feeling.

In summary, it is provided an image processing apparatus according to the embodiment. According to the image processing apparatus, a motion direction of a first image and a motion direction of a second image are calculated based on a preset motion algorithm, where the first image is captured by one of two cameras of the binocular camera and the second image is captured by the other one of the two cameras of the binocular camera; deblurring is performed on the first image and the second image based on a preset deblurring rule; and the images which are already deblurred are combined to obtain a clear three-dimensional perspective image. According to the image processing apparatus, a blurred image generated during imaging is deblurred, the blurring caused by movement or the like may be weakened, the sharpness of the deblurred image is better than the sharpness of the blurred image, thereby leading to a better imaging result.

Figure 11:
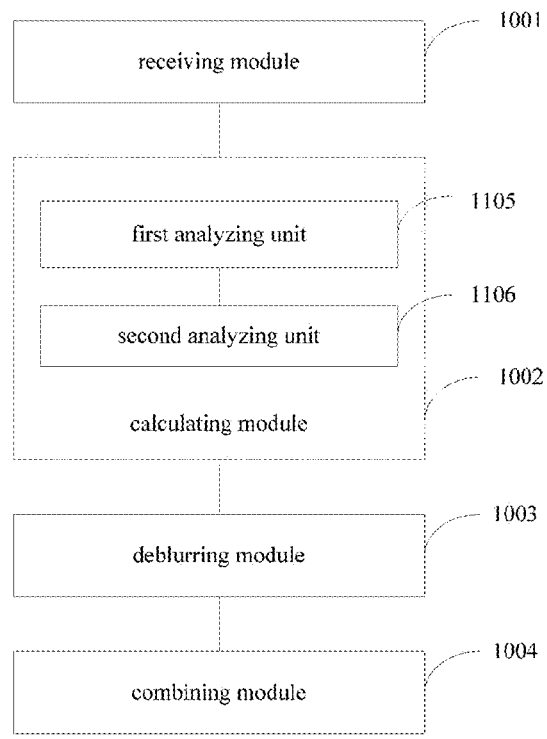
FIG. 11 is a schematic structural diagram of a second embodiment of the image processing apparatus according to the application.

As is shown in FIG. 11, which is a schematic structural diagram of a second embodiment of the image processing apparatus according to the application. The image processing apparatus includes a receiving module 1101, a calculating module 1102, a deblurring module 1103 and a combining module 1104.

The calculating module 1102 includes a first analyzing unit 1105 and a first calculating unit 1106.

The functions of the receiving module 1101, the deblurring module 1103 and the combining module 1104 are respectively the same as the functions of the receiving module 1001, the deblurring module 1003 and the combining module 1004 in the first embodiment of the image processing apparatus, which are not described herein.

The first analyzing unit 1105 is configured to analyze the first image based on a preset depth analyzing rule to obtain a first depth image, and to analyze the second image based on the preset depth analyzing rule to obtain a second depth image.

The depth refers to a spatial distance between the capture object in the image and the camera by which the image is captured.

The depth analyzing rule is preset in the first analyzing unit 1105, the first image is analyzed based on the preset depth analyzing rule to obtain the first depth image of the first image, and the second image is analyzed based on the preset depth analyzing rule to obtain the second depth image of the second image.

Specifically, analyzing the first image based on the preset depth analyzing rule to obtain the first depth image includes: selecting a pixel A from the pixels in the first image; searching for a pixel A' in the second image matching with the pixel A; determining an actual physical position corresponding to the pixel A by using the triangulation algorithm based on a position of the pixel A in the first image, a position of the pixel A' in the second image and a spatial parameter of the binocular camera; calculating a depth value of the pixel A in the first image based on the distance between the actual physical position corresponding to the pixel A and the position of the pixel A in the first image; calculating the depth value of each of the pixels in the first image other than the pixel A; and drawing the first depth image based on the depth value of each of the pixels in the first image.

Specifically, analyzing the second image based on the preset depth analyzing rule to obtain the second depth image includes: selecting a pixel B from the pixels in the second image; searching for a pixel B' in the first image matching with the pixel B; determining an actual physical position corresponding to the pixel B by using the triangulation algorithm based on a position of the pixel B' in the first image, a position of the pixel B in the second image and the spatial parameter of the binocular camera; calculating a depth value of the pixel B in the second image based on the distance between the actual physical position corresponding to the pixel B and the position of the pixel B in the second image; calculating the depth value of each of the pixels in the second image other than the pixel B; and drawing the second depth image based on the depth value of each of the pixels in the second image.

The spatial parameters of the binocular camera include the distance between the centers of two cameras or the like.

It should be noted that the method for calculating the depth image of each image in the embodiment is not limited to the described method. In practice, the method for calculating the depth image may be other methods capable of obtaining the depth image of the image, which is not limited herein.

The first calculating unit 1106 is configured to estimate the first depth image based on a preset estimating algorithm to obtain a first motion direction of a pixel in the first image, and to estimate the second depth image based on the preset estimating algorithm to obtain a second motion direction of a pixel in the second image.

Each pixel in the image corresponds to a depth value, the depth value is a comparable value, the depth values of the pixels are compared to determine whether the pixels are the same pixel.

The estimating algorithm is preset in the first calculating unit 1106, and generally the preset estimating algorithm is the blind deconvolution algorithm.

Specifically, the motion direction may be calculated based on the pixels with the same depth value, the process of calculating the motion direction is described in detail in later embodiments, which is not described herein.

In summary, according to the image processing apparatus provided in the embodiment, the depth image of the first image and the depth image of the second image are determined based on the preset depth analyzing rule, the first motion direction of the pixel in the first image and the second motion direction of the pixel in the second image are obtained based on the preset estimating algorithm in conjunction with the depth images, and deblurring is performed on the blurry image based on the motion direction of blurry image. According to the image processing apparatus, the motion direction of the pixels in the image is calculated based on the depth image of the image, deblurring is performed on a blurry image generated during imaging, the blurring caused by movement or the like may be weakened, the definition of the deblurred image is better than the definition of the blurry image, thereby leading to a better imaging result.

It is provided a third embodiment of the image processing apparatus according to the application. The image processing apparatus includes a receiving module, a calculating module, a deblurring module and a combining module.

The calculating module includes a first analyzing unit and a first calculating unit.

Figure 12:
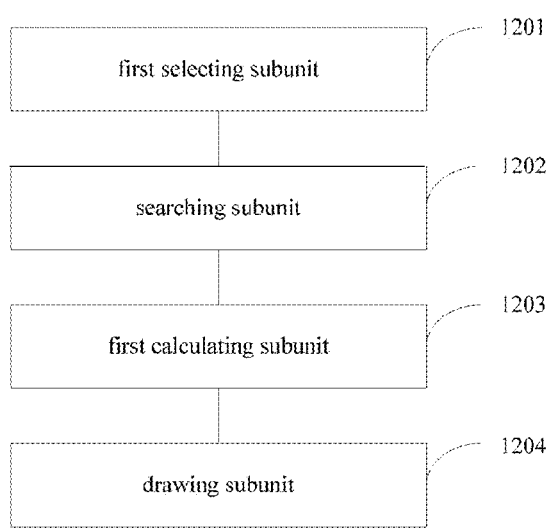
FIG. 12 is a schematic structural diagram of a first analyzing unit in a third embodiment of the image processing apparatus according to the application.

As is shown in FIG. 12, which is a schematic structural diagram of the first analyzing unit in the third embodiment of the image processing apparatus according to the application. The first analyzing unit includes a first selecting subunit 1201, a searching subunit 1202, a first calculating subunit 1203 and a drawing subunit 1204.

The functions of the receiving module, the deblurring module, the combining module and the first calculating unit in the third embodiment of the image processing apparatus are respectively the same as the functions of the receiving module 1101, the deblurring module 1103, the combining module 1104 and the first calculating unit 1106 in the second embodiment of the image processing apparatus, which are not described herein.

The first selecting subunit 1201 is configured to select any one of the first image and the second image as a first base image with the other one as a first reference image, and to select a pixel from the pixels in the first base image.

The first selecting subunit 1201 selects any one of the first image and the second image as the first base image, and the other one is as the first reference image. A motion direction of the pixel in the first base image is calculated based on the first base image and the first reference image.

Each image includes a plurality of pixels, and any one of the pixels in the first base image is selected as a base pixel for determining the motion direction.

It should be noted that the searching subunit 1202 and the first calculating subunit 1203 are used to calculate the motion direction of any one of the pixels in the first base image.

The searching subunit 1202 is configured to search for a corresponding pixel in the first reference image matching with the selected pixel.

The first base image and the first reference image are captured by two cameras of the binocular camera, the two images are similar but there is a little angle difference between the two images. In each of the two images, there is image content corresponding to the same capture object.

Therefore, the searching subunit 1202 searches for a pixel in the first reference image corresponding to the selected pixel, a position of the corresponding pixel in the first reference image is different from a position of the selected pixel in the first base image.

The process performed by the searching subunit 1202 includes: determining a capture object corresponding to the selected pixel in the first base image; the corresponding pixel in the first reference image matching with the selected pixel is searched based on the capture object, and the matching pixel is set as the corresponding pixel matching with the selected pixel.

Specifically, in the case that the selected pixel and the corresponding pixel matching with the selected pixel are for the same capture object (or capture content), a matching degree between the selected pixel and the corresponding pixel is high.

In practice, the process of determining the matching degree between the selected pixel and the corresponding pixel may include: firstly determining the position of the selected pixel in the first base image, and searching for a region in the first reference image close to the position of the selected pixel in the first base image based on the position of the selected pixel in the first base image; and then comparing each of the pixels in the region with the selected pixel in the first base image based on various information about the capture content such as color of the pixel or the like, to obtain the matching degree, the pixel with the highest matching degree is the corresponding pixel matching with the selected pixel.

The first calculating subunit 1203 is configured to determine a depth value of the selected pixel by using a preset depth algorithm based on a position of the selected pixel in the first base image, a position of the corresponding pixel in the first reference image and a spatial parameter of the binocular camera, and to calculate the depth value of each of the pixels in the first base image other than the selected pixel.

The position of the selected pixel in the first base image such as a coordinate position of the selected pixel in the first base image is recorded when the selected pixel is selected.

The first calculating subunit 1203 determines the position, such as a coordinate position, of the corresponding pixel in the first reference image determined by the searching subunit 1202.

The depth algorithm is preset, and an actual physical position corresponding to the selected pixel is calculated by using the preset depth algorithm based on the position of the selected pixel in the first base image, the position of the corresponding pixel in the first reference image and the spatial parameter of the binocular camera. The actual physical position corresponding to the selected pixel refers to the position of the capture object corresponding to the selected pixel in three-dimensional space.

As is shown in FIG. 6, which is a schematic diagram of calculating the actual physical position corresponding to the pixel. C1 and C2 are positions of two cameras of the binocular camera, in an image 601, a pixel x1 is a certain pixel in the image captured by the camera at C1, and in an image 602, a pixel x2 is a certain pixel in the image captured by the camera at C2, the pixel x1 and the pixel x2 are pixels for a capture object X, the capture object X locates at an intersection point between a straight line defined by C1 and the pixel x1 and a straight line defined by C2 and the pixel x2, the distance between C1 and C2 is known, the distance between C1 and the pixel x1 is determined when the pixel x1 is selected, and the distance between C2 and the pixel x2 is determined when the pixel x2 is selected. The distance between the capture object X and the pixel x1 and the distance between the capture object X and the pixel x2 may be calculated according to the trigonometric function. The actual physical position corresponding to the pixel x1 is calculated based on the coordinates of C1, C2, the pixel x1 and the pixel x2.

Specifically, the actual physical position refers to the distance between the capture object X and the electronic device, such as the distance between the capture object X and the midpoint of C1 and C2.

It should be noted that in the case that an xy coordinate system is defined with the straight line defined by C1 and C2 being an x-axis and the direction from C1 to C2 being a positive direction of the x-axis and the direction from a point in the straight line defined by C1 and C2 to the capture object X being a positive direction of a y-axis, the coordinate of the capture object X may be determined as the actual physical position corresponding to the pixel x1.

It should be noted that the actual physical position corresponding to the pixel x1 is the same as the actual physical position corresponding to the pixel x2 in the image 602. In the case that the image 602 is set as the first base image, the actual physical position corresponding to the pixel x2 is not required to be calculated, because the actual physical position corresponding to the pixel x2 is the same as the actual physical position corresponding to the pixel x1 calculated based on the image 601.

The depth value of the pixel x1 refers to the distance between the capture object X corresponding to the pixel x1 and the camera for capturing the image to which the pixel x1 belongs.

The actual physical position corresponding to the pixel x1 is determined, the distance between the actual physical position corresponding to the pixel x1 and the camera for capturing the image to which the pixel x1 belongs is calculated based on the actual physical position corresponding to the pixel x1 and the position of the camera for capturing the image to which the pixel x1 belongs, thereby the depth value of the pixel x1 is calculated.

As is shown in FIG. 6, in the case that the distance between the capture object X to the straight line defined by C1 and C2 is known, the distance between the capture object X to C1 may be calculated according to the triangulation algorithm, thereby the depth value of the pixel x1 in the first base image is calculated.

The first calculating subunit 1203 calculates the depth value of any one of the pixels in the first base image, and similarly calculates the depth value of each of the pixels in the first base image other than the selected pixel.

It should be noted that, the first image is selected as the first base image and the depth value of each of the pixels in the first base image is calculated. In the case that the second image is selected as the first base image, if there is a pixel in the second image matching with a pixel in the first image, the actual physical position corresponding to the pixel in the second image is not required to be calculated, because the actual physical position corresponding to the pixel in the second image is the same as the actual physical position corresponding to the matching pixel in the first image.

The drawing subunit 1204 is configured to draw the depth image of the first base image based on the depth value of each of the pixels in the first base image.

The depth value of each of the pixels in the first base image is determined by the first calculating subunit 1203. The drawing subunit 1204 draws the depth image of the first base image based on the depth value of each of the pixels in the first base image.

Specifically, a gray value of the pixel is used to indicate the depth value of the pixel, the greater the depth value of the pixel is, the greater the gray value of the pixel is.

FIG. 7 shows a first depth image of the first image in FIG. 2A.

The first image is taken as an example, the process performed by the first selecting subunit 1201, the searching subunit 1202, the first calculating subunit 1203 and the drawing subunit 1204 includes: selecting a pixel A from the pixels in the first image; searching for a pixel A' in the second image matching with the pixel A; determining an actual physical position corresponding to the pixel A by using the triangulation algorithm based on a position of the pixel A in the first image, a position of the pixel A' in the second image and a spatial parameter of the binocular camera; calculating a depth value of the pixel A in the first image based on the distance between the actual physical position corresponding to the pixel A and the position of the pixel A in the first image; calculating the depth value of each of the pixels in the first image other than the pixel A; and drawing the first depth image based on the depth value of each of the pixels in the first image.

The second image is taken as an example, the process performed by the first selecting subunit 1201, the searching subunit 1202, the first calculating subunit 1203 and the drawing subunit 1204 includes: selecting a pixel B from the pixels in the second image; searching for a pixel B' in the first image matching with the pixel B; determining an actual physical position corresponding to the pixel B by using the triangulation algorithm based on a position of the pixel B' in the first image, a position of the pixel B in the second image and the spatial parameter of the binocular camera; calculating a depth value of the pixel B in the second image based on the distance between the actual physical position corresponding to the pixel B and the position of the pixel B in the second image; calculating the depth value of each of the pixels in the second image other than the pixel B; and drawing the second depth image based on the depth value of each of the pixels in the second image.

In summary, according to the image processing apparatus provided in the embodiment, the depth value of each of the pixels in the image is calculated, the depth image of the image is drawn, the motion direction of the pixel in the image is determined based on the depth image, deblurring is performed on the image, the images which are already deblurred are combined to obtain a clear three-dimensional perspective image. According to the image processing apparatus, deblurring is performed on a blurry image generated during imaging, the blurring caused by movement or the like may be weakened, the definition of the deblurred image is better than the definition of the blurry image, thereby leading to a better imaging result.

It is provided a fourth embodiment of the image processing apparatus according to the application. The image processing apparatus includes a receiving module, a calculating module, a deblurring module and a combining module.

The calculating module includes a first analyzing unit and a first calculating unit.

Figure 13:
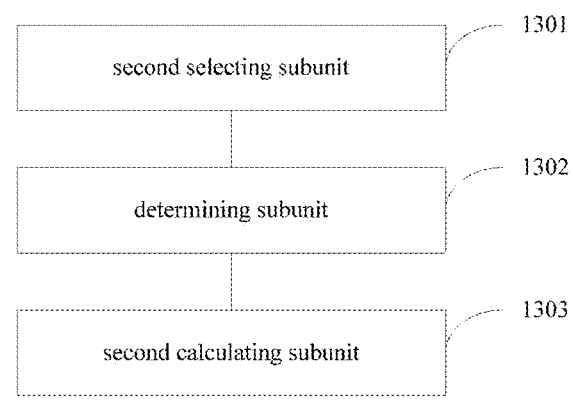
FIG. 13 is a schematic structural diagram of a first calculating unit in a fourth embodiment of the image processing apparatus according to the application.

As is shown in FIG. 13, which is a schematic structural diagram of the first calculating unit in the fourth embodiment of the image processing apparatus according to the application. The first calculating unit includes a second selecting subunit 1301, a determining subunit 1302 and a second calculating subunit 1303.

The functions of the receiving module, the deblurring module, the combining module and the first analyzing unit in the fourth embodiment of the image processing apparatus are respectively the same as the functions of the receiving module 1101, the deblurring module 1103, the combining module 1104 and the first analyzing unit 1105 in the second embodiment of the image processing apparatus, which are not described herein.

The second selecting subunit 1301 is configured to select any one of the first image and the second image as a second base image, and to set the depth image of the second base image as a base depth image.

The second selecting subunit 1301 selects any one of the first image and the second image as the second base image and sets the depth image of the second base image as the base depth image. The motion direction of the pixel in the second base image is calculated based on the second base image and the base depth image of the second base image.

It should be noted that a process performed by the determining subunit 1302 and the second calculating subunit 1303 is the process of calculating the motion direction of any one of the pixels in the second base image.

The determining subunit is configured to determine pixels with the same depth value in the second base image and positions of the pixels with the same depth value in the second base image based on the base depth image.

An actual image blurring principle is that different depth values of the pixels correspond to different motion directions of the pixels which cause the blurring. In the present embodiment, the motion direction of the pixel is calculated based on the depth value of the pixel, and specifically, the motion direction of the pixel is calculated based on the pixels with the same depth value.

Specifically, the determining subunit 1302 determines the pixels with the same depth value in the second base image and positions of the pixels with the same depth value in the second base image based on the base depth image. The pixels with the same depth value in the second base image constitute a pixel group with the same depth value, and the pixel group includes a plurality of pixels.

The second calculating subunit is configured to calculate the motion direction of the pixels with the same depth value in the second base image based on a preset motion direction estimating algorithm in conjunction with information about the positions of the pixels with the same depth value in the second base image, and to calculate the motion direction of each the pixels in the second base image other than the pixels with the same depth value.

The preset motion direction estimating algorithm is the blind deconvolution algorithm.

Specifically, a deblurring rule based on a gradient distribution model is determined based on a statistical properties analysis of an image model and the gradient distribution of a blurry image and a definite image. The definite image meets a specific heavy-tailed distribution rule, and the blurry image does not meet the heavy-tailed distribution rule. A combined posterior probability of an original image and a blurring kernel is created during observing the original image. The blurring kernel is obtained by maximizing the combined posterior probability, which indicates the motion direction of the pixel in the original image.

The motion direction of each of the pixels in the second base image other than the pixels with the same depth value is calculated similarly.

As is shown in FIG. 9, which is a schematic diagram of the motion direction of the depth image shown in FIG. 7. The curve shown in the black box indicates the motion direction of the depth image.

The deblurring module is configured to: perform deconvolution calculation on the pixel in the first image to deblurr the first image to obtain the third image which is already deblurred based on a preset blurring kernel model in conjunction with the first motion direction; and to perform the deconvolution calculation on the pixel in the second image to deblurr the second image to obtain the fourth image which is already deblurred based on the preset blurring kernel model in conjunction with the second motion direction.

The deblurring module performs the deconvolution calculation on each of the pixels in the first image to deblurr the first image to obtain the definite third image based on the preset deblurring rule in conjunction with the blurring kernel calculated by the second calculating subunit 1303 and the first motion direction. And the deblurring module performs the deconvolution calculation on each of the pixels in the second image to deblurr the second image to obtain the definite fourth image based on the preset deblurring rule in conjunction with the blurring kernel calculated by the second calculating subunit 1303 and the second motion direction.

For example, there is a known blurred image $P(x, y)$, the clear image calculated based on the blurred image $P(x, y)$ is represented as an image $I(x, y)$. The relationship between the two images is $P(x, y)=I(x, y)*K$.

In the above equation, * represents a convolution operation, K is the blurring kernel.

The equation is transformed as:

$$I(x, y)=\mathrm{argmin}\|P(x, y)-I(x, y)*K\|^2+\|I(x, y)\|^2.$$

The above equation is solved by using the ROF (Rudin-Osher-Fatemi), deblurring is performed on the blurry image to obtain the definite image.

The ROF (Rudin-Osher-Fatemi) is a known algorithm in the conventional art, which is not described herein.

In summary, according to the image processing apparatus provided in the embodiment, the motion direction of the image is determined based on the preset motion direction estimating algorithm in conjunction with the depth image of the image, deblurring is performed in the image based on the motion direction of the image, the images which are already deblurred are combined to obtain a definite three-dimensional perspective image. According to the image processing apparatus, deblurring is performed on an image generated, the blurring caused by movement or the like may be weakened, the definition of the deblurred image is better than the definition of the blurry image, thereby leading to a better imaging result.

It is provided an image processing apparatus according to the application, and correspondingly, it is also provided an electronic device according to the application. The electronic device includes a binocular camera and any one of the image processing apparatuses according to the above embodiments.

The image processing apparatuses includes a receiving module, a calculating module, a deblurring module and a combining module. The functions of various modules of the image processing apparatuses are respectively the same as the functions of the corresponding modules of any one of the image processing apparatuses according to the above embodiments, which are not described herein.

Optionally, the calculating module includes a first analyzing unit and a first calculating unit. The functions of various modules of the image processing apparatuses are respectively the same as the functions of the corresponding modules of any one of the image processing apparatuses according to the above embodiments, which are not described herein.

Optionally, the first analyzing unit includes a first selecting subunit, a searching subunit, a first calculating subunit and a drawing subunit. The functions of various modules of the image processing apparatuses are respectively the same as the functions of the corresponding modules of any one of the image processing apparatuses according to the above embodiments, which are not described herein.

Optionally, the first calculating unit includes a second selecting subunit, a determining subunit and a second calculating subunit. The functions of various modules of the image processing apparatuses are respectively the same as the functions of the corresponding modules of any one of the image processing apparatuses according to the above embodiments, which are not described herein.

Optionally, the deblurring module is configured to perform deconvolution calculation on the pixel in the first image to deblur the first image to obtain the third image which is already deblurred based on a preset blurring kernel model in conjunction with the first motion direction; and to perform the deconvolution calculation on the pixel in the second image to deblur the second image to obtain the fourth image which is already deblurred based on the preset blurring kernel model in conjunction with the second motion direction.

The embodiments of the present disclosure are described herein in a progressive manner, with an emphasis placed on explaining the difference between each embodiment and the other embodiments; hence, for the same or similar parts among the embodiments, they can be referred to from one another. For the apparatus provided in the embodiments, the corresponding description is relatively simple because the apparatus correspond to the method provided in the embodiments. The relevant portions may be referred to the description for the method parts.

The above description of the embodiments provided herein enables those skilled in the art to implement or use the present disclosure. Numerous modifications to the embodiments will be apparent to those skilled in the art, and the general principle herein can be implemented in other embodiments without deviation from the spirit or scope of the present disclosure. Therefore, the present disclosure will not be limited to the embodiments described herein, but in accordance with the widest scope consistent with the principle and novel features provided herein.

The invention claimed is:

1. An image processing method, comprising:
capturing a first image and a second image using an imaging device;
analyzing the first image based on a preset depth analyzing rule to obtain a first depth image, and analyzing the second image based on the preset depth analyzing rule to obtain a second depth image:
estimating the first depth image based on a preset estimating algorithm to obtain a first motion direction of a pixel in the first image, and estimating the second depth image based on the preset estimating algorithm to obtain a second motion direction of a pixel in the second image;
performing deblurring on the first image based on the motion direction of the first image to obtain a third image, and performing deblurring on the second image based on the motion direction of the second image to obtain a fourth image; and
combining the third image with the fourth image to obtain a fifth image.

2. The image processing method according to claim 1, wherein analyzing the first image based on the preset depth analyzing rule to obtain the first depth image and analyzing the second image based on the preset depth analyzing rule to obtain the second depth image comprises:
selecting one of the first image and the second image as a first base image with the other one as a first reference image;
selecting a pixel from the pixels in the first base image;
searching for a corresponding pixel in the first reference image that matches with the selected pixel in the first base image;
determining a depth value of the selected pixel by using a preset depth algorithm based on a position of the selected pixel in the first base image, a position of the corresponding pixel in the first reference image and a spatial parameter of the imaging device;
calculating the depth value of each of the pixels in the first base image other than the selected pixel; and
deriving a depth image of the first base image based on the depth value of each of the pixels in the first base image.

3. The image processing method according to claim 1, wherein estimating the first depth image based on the preset estimating algorithm to obtain the first motion direction of a pixel in the first image and estimating the second depth image based on the preset estimating algorithm to obtain the second motion direction of a pixel in the second image comprises:
selecting one of the first image and the second image as a second base image and setting the depth image of the second base image as a base depth image;
determining pixels with the same depth value in the second base image and positions of the pixels with the same depth value in the second base image based on the base depth image;
calculating the motion direction of the pixels with the same depth value in the second base image based on a preset motion direction estimating algorithm in conjunction with information about the positions of the pixels with the same depth value in the second base image; and
calculating the motion direction of each of the pixels in the second base image other than the pixels with the same depth value.

4. The image processing method according to claim 3, wherein performing deblurring on the first image based on the preset deblurring rule in conjunction with the first motion direction to obtain the third image and performing deblurring on the second image based on the preset deblurring rule in conjunction with the second motion direction to obtain the fourth image comprises:
performing deconvolution calculation on the pixel in the first image to obtain the third image based on a preset blurring kernel model in conjunction with the first motion direction; and performing the deconvolution calculation on the pixel in the second image to obtain the fourth image based on the preset blurring kernel model in conjunction with the second motion direction.

5. An image processing apparatus, comprising:
an imaging device for capturing a first image and a second image, a processor, and a memory storing processor-executable instructions, wherein the instructions, when executed by the processor, configure the processor to:
analyze the first image based on a preset depth analyzing rule to obtain a first depth image, and to analyze the second image based on the preset depth analyzing rule to obtain a second depth image;
estimate the first depth image based on a preset estimating algorithm to obtain a first motion direction of a pixel in the first image, and to estimate the second depth image based on the preset estimating algorithm to obtain a second motion direction of a pixel in the second image;
perform deblurring on the first image based on the motion direction of the first image to obtain a third image, and perform deblurring on the second image based on the motion direction of the second image to obtain a fourth image; and
combine the third image with the fourth image to obtain a fifth image.

6. The image processing apparatus according to claim 5, wherein the processor is configured to:
select one of the first image and the second image as a first base image with the other one as a first reference image, and to select a pixel from the pixels in the first base image;
search for a corresponding pixel in the first reference image matching with the selected pixel;
determine a depth value of the selected pixel by using a preset depth algorithm based on a position of the selected pixel in the first base image, a position of the corresponding pixel in the first reference image and a spatial parameter of a binocular camera, and calculate the depth value of each of the pixels in the first base image other than the selected pixel; and
draw the depth image of the first base image based on the depth value of each of the pixels in the first base image.

7. The image processing apparatus according to claim 5, wherein the processor is configured to:
select one of the first image and the second image as a second base image, and to set the depth image of the second base image as a base depth image;
determine pixels with the same depth value in the second base image and positions of the pixels with the same depth value in the second base image based on the base depth image; and
calculate the motion direction of the pixels with the same depth value in the second base image based on a preset motion direction estimating algorithm in conjunction with information about the positions of the pixels with the same depth value in the second base image, and calculate the motion direction of each the pixels in the second base image other than the pixels with the same depth value.

8. The image processing apparatus according to claim 7, wherein the processor is configured to:
perform deconvolution calculation on the pixel in the first image to obtain the third image based on a preset blurring kernel model in conjunction with the first motion direction; and
perform the deconvolution calculation on the pixel in the second to obtain the fourth image based on the preset blurring kernel model in conjunction with the second motion direction.

9. The image processing apparatus according to claim 5, wherein the imaging device is a binocular camera.

10. The image processing apparatus according to claim 9, wherein the binocular camera comprises a first and a second cameras, the first camera being configured to capture the first image and the second camera being configured to capture the second image.

11. An electronic device comprising:
a binocular camera for capturing images, a processor, and a memory storing processor-executable instructions, wherein the instructions, when executed by the processor, configure the processor to:
receive a first image and a second image captured by the binocular camera;
analyze the first image based on a preset depth analyzing rule to obtain a first depth image, and to analyze the second image based on the preset depth analyzing rule to obtain a second depth image;
estimate the first depth image based on a preset estimating algorithm to obtain a first motion direction of a pixel in the first image, and to estimate the second depth image based on the preset estimating algorithm to obtain a second motion direction of a pixel in the second image;
perform deblurring on the first image based on the motion direction of the first image to obtain a third image, and perform deblurring on the second image based on the motion direction of the second image to obtain a fourth image; and
a combining module configured to combine the third image with the fourth image to obtain a fifth image.

* * * * *